US011465757B2

(12) United States Patent
Richardson et al.

(10) Patent No.: US 11,465,757 B2
(45) Date of Patent: Oct. 11, 2022

(54) SYSTEMS AND METHODS TO PRODUCE AIRCRAFT CABIN SUPPLY AIR

(71) Applicant: The Boeing Company, Chicago, IL (US)

(72) Inventors: Marcus K. Richardson, Everett, WA (US); Steve G. Mackin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 895 days.

(21) Appl. No.: 16/212,167

(22) Filed: Dec. 6, 2018

(65) Prior Publication Data

US 2020/0180772 A1    Jun. 11, 2020

(51) Int. Cl.
*B64D 13/00* (2006.01)
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0644* (2013.01); *B64D 2013/0688* (2013.01)

(58) Field of Classification Search
CPC ................... B64D 13/08; B64D 13/06; B64D 2013/0688; B64D 2013/0618;
(Continued)

(56) References Cited

U.S. PATENT DOCUMENTS 2,800,002 A   7/1957   Seed
4,015,438 A   4/1977   Kinsell et al.
(Continued)

FOREIGN PATENT DOCUMENTS

CA    2773229     5/2011
CN    102596719   7/2012
(Continued)

OTHER PUBLICATIONS

European Patent Office, "Extended European Search Report", issued in connection with application No. 19207965.5 dated Apr. 17, 2020, 7 pages.

(Continued)

*Primary Examiner* — Phutthiwat Wongwian
*Assistant Examiner* — Sherman D Manley
(74) *Attorney, Agent, or Firm* — Hanley, Flight & Zimmerman, LLC

(57) ABSTRACT

Systems to produce cabin supply air for aircraft and related methods are described herein. An example system includes an air conditioning pack including a heat exchanger including a first flow path and a second flow path isolated from the first flow path. The second flow path is to receive cabin exhaust air from a cabin of an aircraft. The cabin exhaust air is to reduce a temperature of the cabin supply air flowing through the first flow path of the heat exchanger. The system also includes a turbine to receive the cabin supply air from the heat exchanger. The turbine is to reduce a temperature and pressure of the cabin supply air. A turbine outlet of the turbine is fluidly coupled to the cabin to provide the cabin supply air to the cabin. The system further includes a fan to direct the cabin exhaust air from the heat exchanger.

20 Claims, 6 Drawing Sheets

(58) Field of Classification Search
CPC .... B64D 2013/0648; B64D 2013/0662; B64D 2013/0664; Y02T 50/40; Y02T 50/50
See application file for complete search history.

(56) References Cited

U.S. PATENT DOCUMENTS

| | | | | |
|---|---|---|---|---|
| 4,262,495 | A * | 4/1981 | Gupta | B64D 13/06 62/89 |
| 4,419,926 | A | 12/1983 | Cronin et al. | |
| 4,487,034 | A * | 12/1984 | Cronin | F25B 27/00 62/196.3 |
| 4,503,666 | A | 3/1985 | Christoff | |
| 4,684,081 | A | 8/1987 | Cronin | |
| 5,036,678 | A | 8/1991 | Renninger et al. | |
| 5,063,963 | A | 11/1991 | Smith | |
| 5,114,100 | A | 5/1992 | Rudolph | |
| 5,136,837 | A | 8/1992 | Davison | |
| 5,143,329 | A | 9/1992 | Coffinberry | |
| 5,363,641 | A | 11/1994 | Dixon et al. | |
| 5,414,992 | A | 5/1995 | Glickstein | |
| 5,482,229 | A * | 1/1996 | Asshauer | B64D 13/06 454/115 |
| 5,524,848 | A | 6/1996 | Ellsworth | |
| 5,701,755 | A * | 12/1997 | Severson | B64D 13/00 62/88 |
| 5,813,630 | A | 9/1998 | Williams | |
| 5,899,805 | A | 5/1999 | Dowd et al. | |
| 5,967,461 | A * | 10/1999 | Farrington | B64D 13/06 454/115 |
| 6,189,324 | B1 | 2/2001 | Williams et al. | |
| 6,305,156 | B1 | 10/2001 | Lui | |
| 6,401,473 | B1 | 6/2002 | Ng et al. | |
| 6,415,595 | B1 * | 7/2002 | Wilmot, Jr | F02C 7/224 60/785 |
| 6,491,254 | B1 * | 12/2002 | Walkinshaw | B64D 13/00 244/119 |
| 6,526,775 | B1 | 3/2003 | Asfia et al. | |
| 6,629,428 | B1 | 10/2003 | Murry | |
| 6,681,592 | B1 * | 1/2004 | Lents | B64D 13/06 62/401 |
| 6,688,558 | B2 | 2/2004 | Breer et al. | |
| 6,709,246 | B2 | 3/2004 | Boyd | |
| 6,796,131 | B2 | 9/2004 | Sampson | |
| 6,942,183 | B2 | 9/2005 | Zywiak | |
| 6,971,241 | B2 | 12/2005 | Critchley et al. | |
| 6,997,013 | B2 * | 2/2006 | Jones | B64D 10/00 62/401 |
| 7,207,521 | B2 | 4/2007 | Atkey et al. | |
| 7,246,482 | B2 | 7/2007 | Mahoney et al. | |
| 7,467,524 | B2 * | 12/2008 | Brutscher | B64D 13/06 62/401 |
| 7,607,318 | B2 | 10/2009 | Lui et al. | |
| 7,618,008 | B2 | 11/2009 | Scherer et al. | |
| 7,727,057 | B2 | 6/2010 | Beier et al. | |
| 7,871,038 | B2 | 1/2011 | Space et al. | |
| 7,980,928 | B2 * | 7/2011 | Markwart | B64D 13/06 237/12.3 A |
| 8,047,470 | B2 | 11/2011 | Porte | |
| 8,063,501 | B2 | 11/2011 | Finney | |
| 8,529,189 | B2 | 9/2013 | Brown et al. | |
| 8,769,962 | B2 | 7/2014 | Glahn et al. | |
| 8,955,794 | B2 | 2/2015 | Mackin et al. | |
| 8,967,528 | B2 | 3/2015 | Mackin et al. | |
| 9,163,562 | B2 | 10/2015 | Suciu et al. | |
| 9,416,677 | B2 | 8/2016 | Munsell et al. | |
| 9,669,936 | B1 * | 6/2017 | Fiterman | B64D 13/06 |
| 9,765,700 | B2 | 9/2017 | Mackin et al. | |
| 9,810,158 | B2 | 11/2017 | Foutch et al. | |
| 9,835,050 | B2 | 12/2017 | Marche | |
| 9,879,610 | B2 | 1/2018 | Moes | |
| 10,550,770 | B2 | 2/2020 | Foutch et al. | |
| 10,870,490 | B2 * | 12/2020 | Bruno | B64D 13/02 |
| 10,988,262 | B2 * | 4/2021 | Horner | B64D 41/00 |
| 2001/0032472 | A1 | 10/2001 | Buchholz et al. | |
| 2003/0005718 | A1 * | 1/2003 | Mitani | B64D 13/06 62/271 |
| 2003/0051492 | A1 * | 3/2003 | Hartenstein | B64D 13/06 62/402 |
| 2003/0177781 | A1 | 9/2003 | Haas et al. | |
| 2004/0014420 | A1 * | 1/2004 | Bruno | B64D 13/06 454/237 |
| 2004/0172963 | A1 | 9/2004 | Axe et al. | |
| 2005/0051668 | A1 | 3/2005 | Atkey et al. | |
| 2006/0260323 | A1 | 11/2006 | Moulebhar | |
| 2006/0272313 | A1 | 12/2006 | Eick et al. | |
| 2008/0110193 | A1 * | 5/2008 | Jonqueres | B64D 13/06 62/331 |
| 2008/0314060 | A1 | 12/2008 | Parikh | |
| 2009/0277445 | A1 * | 11/2009 | Markwart | B64D 13/00 128/203.12 |
| 2009/0314002 | A1 | 12/2009 | Libera et al. | |
| 2010/0107594 | A1 | 5/2010 | Coffinberry et al. | |
| 2010/0192574 | A1 | 8/2010 | Langson | |
| 2010/0192593 | A1 | 8/2010 | Brown et al. | |
| 2011/0107777 | A1 | 5/2011 | Atkey et al. | |
| 2012/0111022 | A1 | 5/2012 | Dyer | |
| 2012/0186267 | A1 | 7/2012 | Coffinberry et al. | |
| 2013/0098059 | A1 | 4/2013 | Suciu et al. | |
| 2013/0164115 | A1 | 6/2013 | Sennoun | |
| 2013/0187007 | A1 | 7/2013 | Mackin et al. | |
| 2013/0269374 | A1 | 10/2013 | Kelnhofer | |
| 2014/0196470 | A1 | 7/2014 | Glahn et al. | |
| 2015/0121842 | A1 * | 5/2015 | Moes | F02C 6/08 60/225 |
| 2015/0233291 | A1 | 8/2015 | Pelagatti et al. | |
| 2015/0275758 | A1 | 10/2015 | Foutch et al. | |
| 2015/0275769 | A1 | 10/2015 | Foutch et al. | |
| 2016/0369705 | A1 | 12/2016 | Mackin et al. | |
| 2017/0268430 | A1 | 9/2017 | Schwarz | |
| 2017/0268431 | A1 | 9/2017 | Schwarz | |
| 2019/0383220 | A1 | 12/2019 | Mackin | |

FOREIGN PATENT DOCUMENTS

| | | |
|---|---|---|
| DE | 102006042584 | 3/2008 |
| EP | 0888966 | 1/1999 |
| EP | 2470425 | 7/2012 |
| EP | 3296543 | 3/2018 |
| JP | 2013510042 | 3/2013 |
| WO | 1999/20528 | 4/1999 |
| WO | 2000/37313 | 6/2000 |
| WO | 0123724 | 4/2001 |
| WO | 2007/093389 | 8/2007 |
| WO | 2011/056285 | 5/2011 |

OTHER PUBLICATIONS

European Patent Office, "Extended European Search Report", issued in connection with application No. 19179755.4 dated Oct. 30, 2019, 5 pages.

United States Patent and Trademark Office, "Notice of Allowance and Fee(s) Due", issued in connection with U.S. Appl. No. 15/787,511 dated Sep. 25, 2019, 8 pages.

United States Patent and Trademark Office, "Restriction Requirement", issued in connection with U.S. Appl. No. 16/012,327 dated Feb. 20, 2020, 8 pages.

14 C.F.R. Part 25.831 effective as of Jan. 21, 1997, last retrieved from http://www.airweb.faa.gov/Regulatory_and_Guidance_Library%5CrgFAR.nsf/0/E84799D57F7D41DF852566720051B01D?OpenDocument on Aug. 2, 2013, 3 pages.

Extended European Search Report, issued by the European Patent Office in connection with European Patent Application No. 14175279.0 dated Dec. 3, 2014, 9 pages.

Communication Under Rule 71(3) EPC, issued by the European Patent Office in connection with European Application No. 10 750 014.2-1753, mailed on Jun. 28, 2013, 5 pages.

International Search Report, issued by the International Searching Authority in connection with International Application No. PCT/US2010/047357, dated Dec. 3, 2010, 5 pages.

(56) References Cited

OTHER PUBLICATIONS

Written Opinion, issued by the International Searching Authority issued in connection with International Application No. PCT/US2010/047357, dated Dec. 3, 2010, 5 pages.
International Preliminary Report on Patentability, issued by the International Bureau in connection with International Application No. PCT/US2010/047357, dated May 8, 2012, 6 pages.
Office Action, issued by the United States Patent and Trademark Office in connection with U.S. Appl. No. 12/614,441, dated Apr. 26, 2013, 21 pages.
Office Action, issued by the United States Patent and Trademark Office in connection with U.S. Appl. No. 12/614,441, dated Jul. 3, 2014, 24 pages.
Final Rejection, issued by the United States Patent and Trademark Office in connection with U.S. Appl. No. 12/614,441, dated Jan. 3, 2014, 22 pages.
Advisory Action, issued by the United States Patent and Trademark Office in connection with U.S. Appl. No. 12/614,441, dated May 22, 2014, 3 pages.
Notice of Allowance and Fee(s) Due, issued by the United States Patent and Trademark Office in connection with U.S. Appl. No. 12/614,441, dated Dec. 5, 2014, 7 pages.
Restriction and/or Election Requirement, issued by the United States Patent and Trademark Office in connection with U.S. Appl. No. 13/357,293, dated Sep. 25, 2013, 5 pages.
Office Action, issued by the United States Patent and Trademark Office in connection with U.S. Appl. No. 13/357,293, dated Feb. 7, 2014, 9 pages.
Notice of Allowance and Fee(s) Due, issued by the United States Patent and Trademark Office in connection with U.S. Appl. No. 13/357,293, dated Sep. 30, 2014, 13 pages.
Office Action, issued by the United States Patent and Trademark Office in connection with U.S. Appl. No. 13/951,181, dated Apr. 16, 2014, 9 pages.
Notice of Allowance and Fee(s) Due, issued by the United States Patent and Trademark Office in connection with U.S. Appl. No. 13/951,181, dated Sep. 30, 2014, 14 pages.
Communication Pursuant to Article 94(3) EPC, issued by the European Patent Office in connection with European Patent Application 13152433.2, on Oct. 28, 2015, 4 pages.
United States Patent and Trademark Office, "Non-Final Office Action," issued in connection with U.S. Appl. No. 14/632,322, dated Aug. 12, 2016, 21 pages.
United States Patent and Trademark Office, "Restriction and/or Election Requirement," issued in connection with U.S. Appl. No. 14/242,570, dated Nov. 2, 2016, 10 pages.
United Stated Patent and Trademark Office, "Restriction and/or Election Requirement," issued in connection with U.S. Appl. No. 14/242,493, dated Dec. 6, 2016, 9 pages.
United Stated Patent and Trademark Office, "Non-Final Office Action," issued in connection with U.S. Appl. No. 14/242,570, dated Dec. 16, 2016, 23 pages.
United States Patent and Trademark Office, "Non-Final Office Action," issued in connection with U.S. Appl. No. 14/242,493, dated Mar. 20, 2017, 63 pages.
United States Patent and Trademark Office, "Notice of Allowance and Fee(s) Due," issued in connection with U.S. Appl. No. 14/632,322, dated Apr. 17, 2017, 17 pages.
United States Patent and Trademark Office, "Notice of Allowance and Fee(s) Due," issued in connection with U.S. Appl. No. 14/242,570, dated Jun. 28, 2017, 38 pages.
United States Patent and Trademark Office, "Notice of Allowance and/or Fees Due," issued in connection with U.S. Appl. No. 14/242,493, dated Apr. 4, 2018, 20 pages.
United States Patent and Trademark Office, "Non-Final Office Action," issued in connection with U.S. Appl. No. 14/744,398, dated Jan. 26, 2018, 43 pages.

* cited by examiner

SYSTEMS AND METHODS TO PRODUCE AIRCRAFT CABIN SUPPLY AIR

FIELD OF THE DISCLOSURE

This disclosure relates generally to aircraft and, more particularly, to systems and methods to produce aircraft cabin supply air.

BACKGROUND

Known commercial aircraft include an air conditioning pack that conditions (e.g., regulates the temperature and pressure) of cabin supply air that is provided to a cabin of the aircraft. In known systems, the air conditioning pack receives high pressure air that is bled from a compressor of an engine of the aircraft. The bleed air is often extracted from a higher stage of the compressor that provides bleed air having a pressure and/or temperature above that demanded by the air conditioning pack and then reduced in pressure, via a pressure regulating valve, prior to providing the bleed air to the air conditioning pack. The air conditioning pack receives the bleed air and regulates the air to a desired temperature and/or pressure that is then provided as cabin supply air to the cabin. In these known air conditioning packs, the incoming bleed air to directed through a heat exchanger to reduce a temperature of the bleed air. The heat exchanger uses outside atmospheric air from a ram air inlet as working fluid to cool the incoming bleed air. The bleed air is then directed through a compressor to provide a load for a turbine, through a heat exchanger to remove heat, and through the turbine to reduce the temperature for conditioning an environment. The turbine, the compressor, and a fan are mechanically connected via shaft. The compressor and the fan provide a load to the turbine. The turbine drives the fan to move ram air through the heat exchanger.

SUMMARY

Disclosed herein is an example system to produce air for a cabin of an aircraft. The system includes an air conditioning pack including a heat exchanger including a first inlet fluidly coupled to a first outlet via a first flow path, the first inlet to receive cabin supply air from a high pressure air source, and a second inlet fluidly coupled to a second outlet via a second flow path. The second flow path is isolated from the first flow path. The second inlet is to receive cabin exhaust air from the cabin of the aircraft. The cabin exhaust air is to reduce a temperature of the cabin supply air via the heat exchanger. The system also includes a turbine having a turbine inlet and a turbine outlet. The turbine inlet is fluidly coupled to the first outlet of the heat exchanger. The turbine is to reduce a temperature and pressure of the cabin supply air between the turbine inlet and the turbine outlet. The turbine outlet is fluidly coupled to the cabin to provide the cabin supply air to the cabin. The system further includes a fan to direct the cabin exhaust air from the heat exchanger to atmosphere.

Another example system to produce air for a cabin of an aircraft is disclosed herein. The system includes an air conditioning pack including a heat exchanger including a first flow path to receive cabin supply air, and a second flow path, isolated from the first flow path, to receive cooling air. The cooling air is to reduce a temperature of the cabin supply air flowing through the first flow path. The system also includes a turbine having a turbine inlet and a turbine outlet. The turbine inlet is to receive the cabin supply air from the heat exchanger. The turbine outlet is fluidly coupled to the cabin to supply the cabin supply air to the cabin. The system further includes a generator. The turbine is coupled to the generator, and the turbine is to drive the generator to generate power. Further, the system includes a fan to control a flow rate of the cooling air through the second flow path of the heat exchanger. The fan driven by an electric motor that is powered via the power generated by the generator.

An example aircraft disclosed herein includes a fuselage having a cabin and a system to produce air for the cabin. The system includes a compressor to produce pressurized air to be used as cabin supply air and an air conditioning pack. The air conditioning pack includes a heat exchanger to receive the cabin supply air from the compressor. The heat exchanger is to reduce a temperature of the cabin supply air. The air conditioning pack further includes a turbine having a turbine inlet and a turbine outlet. The turbine inlet is to receive the cabin supply air from the heat exchanger. The turbine outlet is fluidly coupled to the cabin to supply the cabin supply air to the cabin. The compressor is not driven by the turbine.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
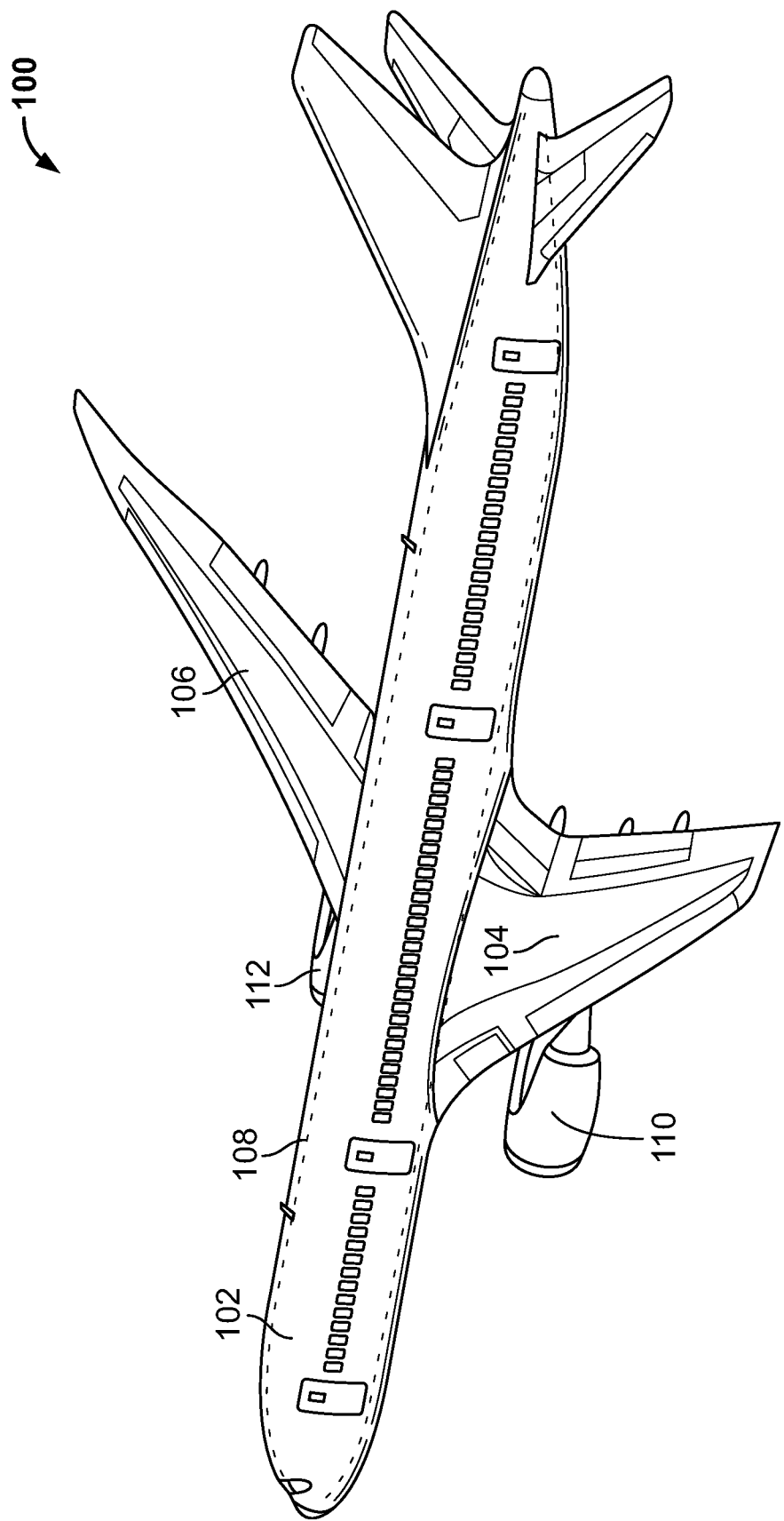
FIG. 1 illustrates an example aircraft in which the examples disclosed herein can be implemented.

Example systems and methods to produce cabin supply air for aircraft are disclosed herein. The example systems disclosed herein include an air conditioning pack that conditions the cabin supply air to a desired temperature and/or pressure. The conditioned supply air which is used to pressurize the cabin and/or cool the cabin of the aircraft. An example system disclosed herein includes a heat exchanger that receives cabin supply air from a variable high pressure air source. In some examples, the variable high pressure air source is a shaft-drive compressor that is driven by an engine of the aircraft. In other examples, the variable high pressure air source is implemented using another source of air, such as bleed air from the engine of the aircraft. The cabin supply air is directed through a heat exchanger that reduces the temperature and pressure of the cabin supply air. In some examples disclosed herein, cabin exhaust air is used as the working fluid in the heat exchanger to cool the incoming cabin supply air. By using the cabin exhaust air instead of atmospheric air like in known systems, the example systems enable ram air inlets to be eliminated from the aircraft, thereby reducing drag on the aircraft otherwise caused by such inlets.

Further, some example air conditioning packs disclosed herein utilize a turbine that is de-coupled from a compressor (i.e., does not form part of a turbo-compressor). Instead, in some examples, the load on the turbine is provided by a generator. The turbine drives the generator to produce power that can be used by one or more devices on the aircraft. In some examples, the power produced by the generator is used to power a fan that controls the flow rate of the cabin exhaust air through the heat exchanger. Therefore, in some examples, the turbine, the compressor, and the fan are all de-coupled and independently controllable. In other examples, the turbine may be mechanically coupled (e.g., via a gearbox) to the fan.

One or more parameters of the turbine, the compressor, and/or the fan can be controlled to regulate the condition of the air flowing through the respective devices. For example, the speed of the fan and/or a variable area nozzle of the fan can be controlled to affect the flow rate of the cabin exhaust air thought the heat exchanger, thereby affecting the amount of cooling of the incoming cabin supply air. The turbine can be controlled by, for example, controlling the load produced by the generator and/or controlling a variable area nozzle of the turbine. Further, the compressor can be controlled by, for example, controlling the gearing in a gearbox between the engine of the aircraft and the compressor, controlling variable inlet guide vanes of the compressor, and/or controlling variable outlet guide vanes compressor. Therefore, these parameters of the turbine, compressor, and fan can be independently controlled to produce optimal air flow at each stage of the system, ultimately producing cabin supply air with a desired temperature and pressure that is supplied to the cabin of the aircraft.

FIG. 1 illustrates an example aircraft 100 in which the examples disclosed herein can be implemented. The aircraft 100 includes a fuselage 102, a first wing 104 coupled to the fuselage 102, and a second wing 106 coupled to the fuselage 102. The fuselage 102 defines a cabin 108 (shown in dashed lines) where the passengers and/or cargo are carried. In the illustrated example, the aircraft 100 includes a first engine 110 carried by the first wing 104 and a second engine 112 carried by the second wing 106. In other examples, the aircraft 100 may include only one engine or may include more than two engines. The engine(s) can be carried on the first and/or second wings 104, 106 and/or another structure on the aircraft 100 (e.g., on the tail section of the fuselage 102).

Figure 2:
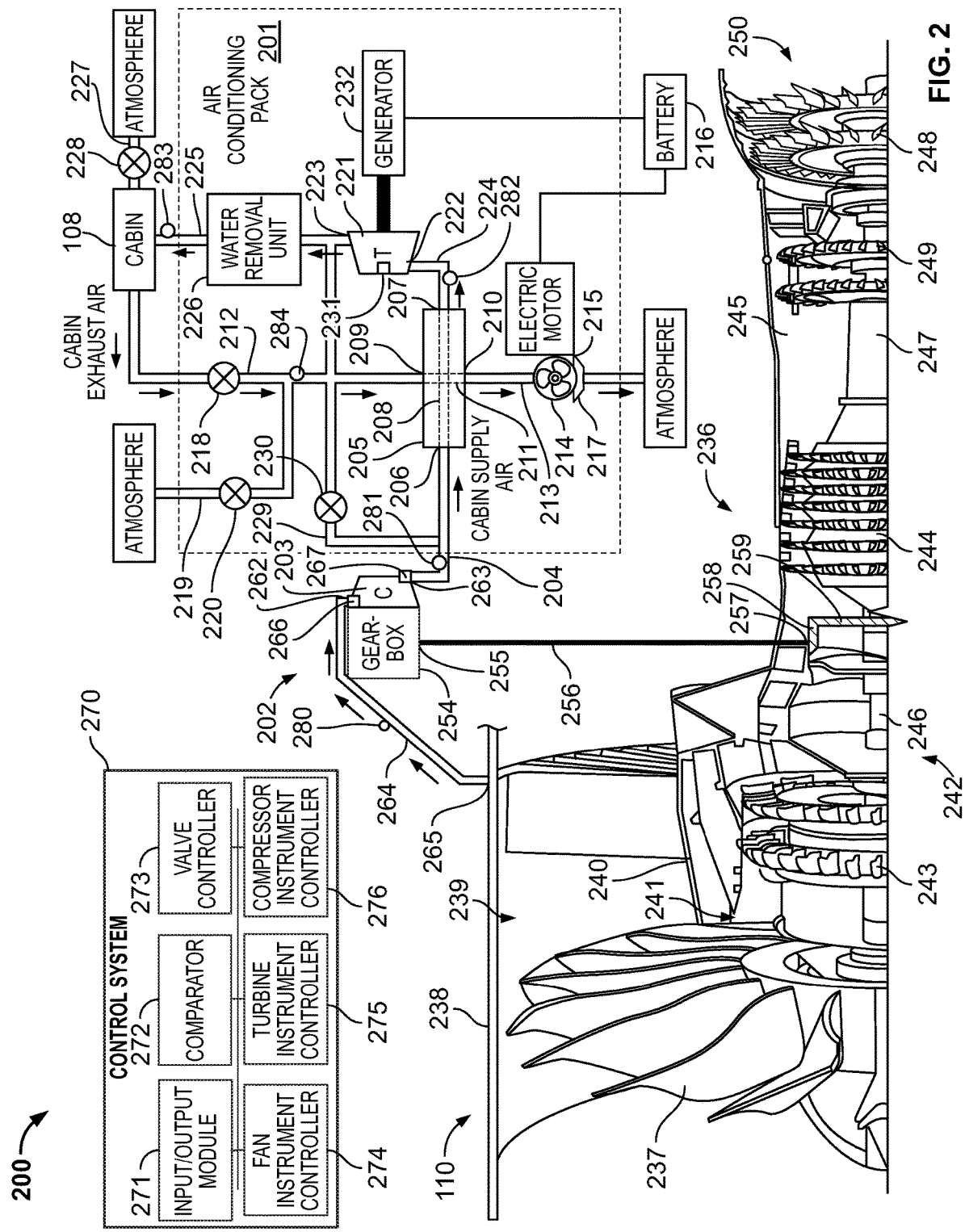
FIG. 2 is a schematic illustration of an example system to produce cabin air implemented in connection with an engine of the example aircraft of FIG. 1.

FIG. 2 is a schematic illustration of an example system 200 constructed in accordance with the teachings of this disclosure. The system 200 is configured to provide air for the cabin 108 of the aircraft 100 (FIG. 1). In particular, the air provided by the system 200 is used to pressurize the cabin 108 as well as provide cooler air for regulating the temperature of the air in the cabin 108 to a comfortable setting. The example system 200 of FIG. 2 is shown as being implemented in connection with the first engine 110 (shown in a partial cutaway view) of the example aircraft 100 (FIG. 1). A similar system 200 may be implemented in connection with the second engine 112 (FIG. 1). Thus, in some examples, two of the example system 200 are implemented on the aircraft 100 (FIG. 1). In other examples, only one of the example system 200 is implemented in connection with one of the engines 110, 112 on the aircraft 100 (FIG. 1).

Figure 4:
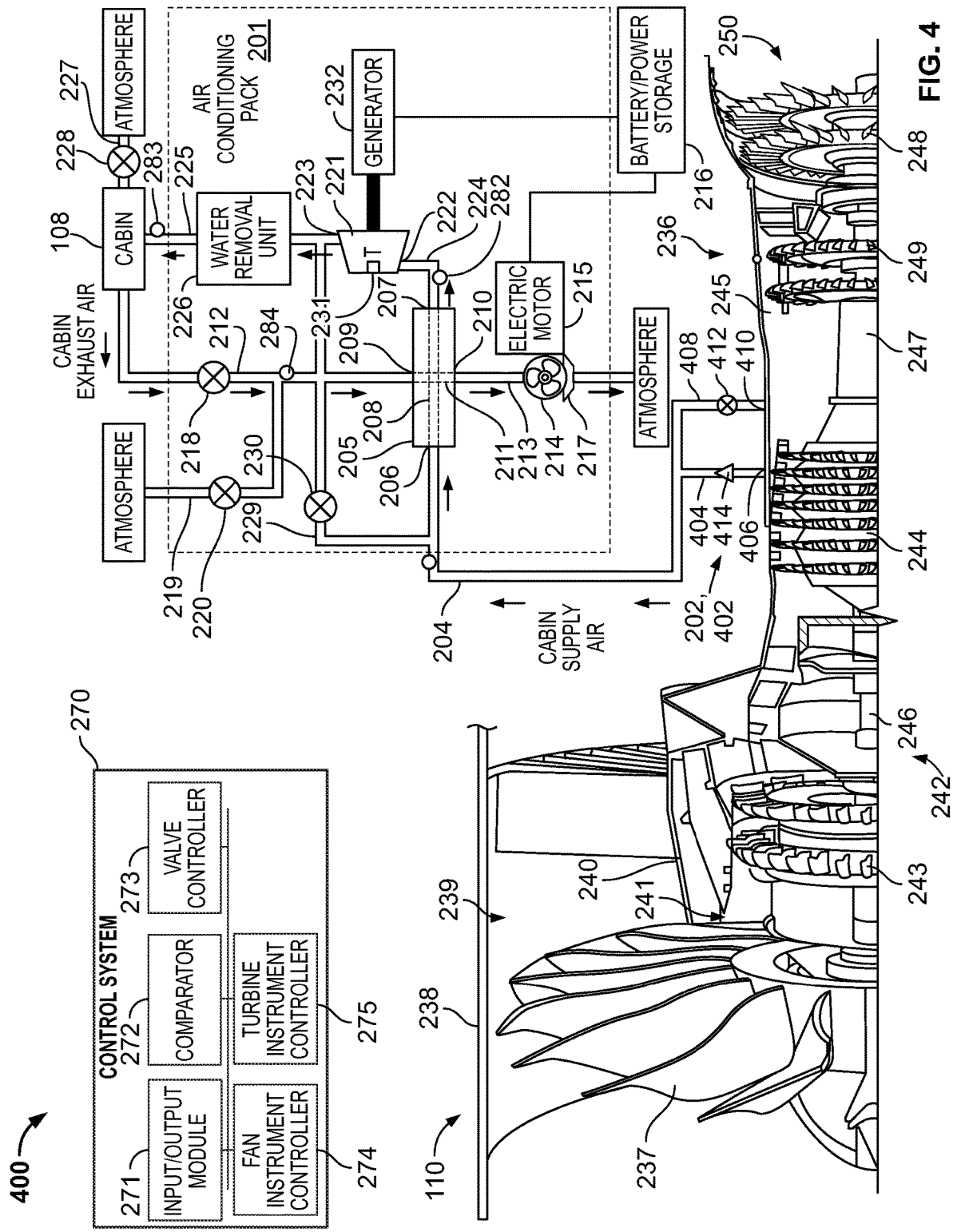
FIG. 4 is a schematic illustration of another example system to produce cabin air implemented in connection with an engine of the example aircraft of FIG. 1.

In the illustrated example, the system 200 includes an example air conditioning pack 201 that conditions and regulates air to a target pressure and/or temperature. In particular, the air conditioning pack 201 receives cabin supply air from a high pressure air source 202 and conditions or regulates the cabin supply air to a desired temperature, pressure, and/or flow rate. For example, in some aircraft, the target temperature of the cabin supply air is 27° Fahrenheit (F), the target pressure is 11 pounds-per-square-inch (PSI), and the flow rate is 0.055 pound mass (lb)/min/passenger. In this example, the high pressure air source 202 is a shaft-driven compressor 203, which is disclosed in further detail herein. In some examples, using a shaft-driven compressor enables improved control of the temperature and pressure of the air provided to the air conditioning pack 201 as compared to known systems. In other examples the high pressure air source 202 may be another source of high pressure air, such as bleed air extracted from the first engine 110, as illustrated in the example of FIG. 4.

In the illustrated example of FIG. 2, the air conditioning pack 201 receives cabin supply air from the high pressure air source 202 via a passageway 204 (which may be referred to as an inlet passageway). The air conditioning pack 201 includes a heat exchanger 205 to reduce a temperature of the cabin supply air from the high pressure air source 202. In the illustrated example, the heat exchanger 205 includes a first inlet 206 fluidly coupled to a first outlet 207 via a first flow path 208. The passageway 204 is fluidly coupled to and directs the cabin supply air to the first inlet 206. As such, the first inlet 206 receives the cabin supply air from the high pressure air source 202.

The heat exchanger 205 of the illustrated example further includes a second inlet 209 fluidly coupled to a second outlet 210 via a second flow path 211 (which may be referred to as a cross-flow path). The second flow path 211 is isolated from the first flow path 208. A cooling fluid is directed through the second flow path 211 of the heat exchanger 205 to reduce a temperature of the cabin supply air flowing through the first flow path 208. In this example, the cooling fluid is cabin exhaust air (i.e., air that is vented or exhausted from the cabin 108). In the illustrated example of FIG. 2, a passageway 212 fluidly couples the cabin 108 to the second inlet 209 of the heat exchanger 205. As such, the second inlet 209 receives the cabin exhaust air from the cabin 108. The cabin exhaust air flows through the second flow path 211 of the heat exchanger 205 and reduces a temperature of the cabin supply air flowing through the first flow path 208 of the heat exchanger 205.

The cabin exhaust air exiting the second outlet 210 of the heat exchanger 205 is directed out into the atmosphere (e.g., via an outlet port on the aircraft 100). A passageway 213 is fluidly coupled to the second outlet 210 and directs the cabin exhaust air exiting the second outlet 210 to the atmosphere. In the illustrated example, the air conditioning pack 201 includes a fan 214 coupled to and/or otherwise disposed in the passageway 213. The fan 214 directs the cabin exhaust air from the heat exchanger 205 to the atmosphere. The fan 214 controls the flow of the cabin exhaust air through the heat exchanger 205 and, thus, controls the amount of cooling on the cabin supply air. For example, if the fan 214 is operated at a higher speed, more cabin exhaust air is driven through the heat exchanger 205, which provides more cooling of the cabin supply air flowing through the heat exchanger 205. Conversely, if the fan 214 is operated at a lower speed, less cabin exhaust air is driven through the heat exchanger 205, which results in less cooling of the cabin supply air. As such, the fan 214 also controls the pressure of the air in the cabin 108.

In this example, the air conditioning pack 201 includes an electric motor 215 to drive the fan 214. The electric motor 215 is powered by a battery 216 of the aircraft 100. The electric motor 215 can control the speed of the fan 214 to produce the variable cooling effects discussed above. Additionally or alternatively, one or more other aspects of the fan 214 can be controlled to control the flow of the cabin exhaust air through the heat exchanger 205. For instance, in some examples, the fan 214 includes a variable area nozzle 217. An aperture of the variable area nozzle 217 can be can be increased or decreased to change the flow rate of the cabin exhaust air through the passageway 213. In some examples, a valve 218 is coupled to the passageway 212. The valve 218 is used to open or close the passageway 212 and/or reduce the pressure of the cabin exhaust air flowing to the heat exchanger 205. While in the illustrated example the fan 214 is disposed downstream of the heat exchanger 205, in other examples, the fan 214 may be coupled to the passageway 212 upstream of the heat exchanger 205. However, in some examples, it is advantageous to dispose the fan 214 downstream of the heat exchanger 205 because the fan 214 can add a small amount of heat to the cabin exhaust air.

Thus, the example air conditioning pack 201 uses the cabin exhaust air to cool incoming cabin supply air, which is a more efficient use of the cabin exhaust air than dumping the cabin exhaust air to the atmosphere as in known systems. Further, by using cabin exhaust air as the cooling air in the heat exchanger 205 instead of ram air from the atmosphere as in known systems, the example air conditioning pack 201 reduces or eliminates the need for ram air inlets that cause drag on the aircraft 100 and ram air circuits that add weight to the aircraft. The cabin exhaust air provides sufficient cooling because the speed and/or nozzle area of the fan 214 can be varied to provide improved flow control than in known systems. Further, the example system 200 enables improved control the temperature and pressure of the cabin supply air from the high pressure air source 202, as disclosed in further detail herein. As such, less cold air is needed as the working fluid to further reduce the temperature of the cabin supply air. In some examples, such as shown in FIG. 2, a passageway 219 can be fluidly coupled to the passageway 212 to provide cold atmospheric air in cases where the cabin exhaust air is insufficient for cooling. The atmospheric air at cruise altitude is relatively cold with low pressure. However, it is expected that the cabin exhaust air is the main source of cooling air for a majority of the flight, thereby reducing or eliminating the need for a ram air circuit and, thus, reducing drag on the aircraft. Further, during warmer days when the aircraft 100 (FIG. 1) is on the ground, the cabin exhaust air provides better cooling capabilities than the relatively hot ambient air. If atmospheric air is used, the atmospheric air can be mixed with the cabin exhaust air supplied to the second inlet 209 of the heat exchanger 205. In the illustrated example, a valve 220 is coupled to the passageway 219. The valve 220 may be opened to direct atmospheric air into the second inlet 209 of the heat exchanger 205 (along with cabin exhaust air) or closed to prevent the flow of atmospheric air to the second inlet 209. In other examples, the passageway 219 may not be provided. Instead, the cabin exhaust air may be the only source of cooling air for the heat exchanger 205.

In the illustrated example, the air conditioning pack 201 includes a turbine 221 having a turbine inlet 222 and a turbine outlet 223. A passageway 224 fluidly couples the first outlet 207 of the heat exchanger 205 and the turbine inlet 222. Therefore, after flowing through the heat exchanger 205, the cabin supply air flows through the turbine 221. The turbine 221 reduces a temperature and pressure of the cabin supply air between the turbine inlet 222 and the turbine outlet 223. In particular, the cabin supply air drives an impeller in the turbine 221 and expands, thereby reducing the temperature and pressure of the cabin supply air. In the illustrated example, the turbine outlet 223 is fluidly coupled to the cabin 108 to provide the cabin supply air to the cabin 108. In particular, a passageway 225 fluidly couples the turbine outlet 223 to the cabin 108. In some examples, before being supplied to the cabin 108, the cabin supply air flows through a water removal unit 226 (e.g., a dehumidifier) that removes water from the cabin supply air. In some examples, the water removal unit 226 recirculates some of the air through the turbine 221.

The cabin supply air is provided to the cabin 108 and cools and pressurizes the cabin. In some examples, the cabin supply air that is provided to the cabin 108 is at a temperature of about 50° F. and a pressure of about 14 PSI. The air in the cabin 108 is then exhausted as cabin exhaust air that is used to cool the incoming cabin supply air through the heat exchanger 205. In some examples, another vent is provided to vent the cabin air to atmosphere. In particular, a passageway 227 fluidly couples the cabin 108 to the atmosphere. A valve 228 is coupled to the passageway 227. The valve 228 may be opened to enable air to be vented from the cabin 108, thereby regulating the pressure of the air in the cabin 108.

As illustrated in FIG. 2, in some examples, a bypass passageway 229 is provided to bypass the heat exchanger 205 and the turbine 221. The bypass passageway 229 connects the passageway 204 and the passageway 225, thereby bypassing the heat exchanger 205 and the turbine 221. A valve 230 is coupled to the bypass passageway 229 to control the flow of fluid through the bypass passageway 229. In some examples, the valve 230 is opened to allow relatively hot, high pressure air from the passageway 204 to flow through the bypass passageway 229 and mix with the relatively cool, low pressure air exiting the turbine outlet 223.

As shown in FIG. 2, unlike known air conditioning packs, the turbine 221 in the example air conditioning pack 201 is de-coupled from a compressor (i.e., is not part of a turbo-compressor). In other words, the turbine 221 is not mechanically coupled to or driving a compressor, including the shaft-driven compressor 203. This enables more variability and control of the turbine 221. For instance, in some examples, the turbine 221 has a variable area nozzle 231. The size of the variable area nozzle 231 may be increased or decreased to control the temperature and pressure drop across the turbine 221. Additionally or alternatively, a load on the turbine 221 can be controlled by a generator (disclosed in further detail below). These parameters can be varied to control the amount of pressure and temperature drop through the turbine 221 without directly affecting the other components of the air conditioning pack 201 (e.g., the compressor 203 and fan 214) as seen in the known systems.

In the illustrated example of FIG. 2, the air conditioning pack 201 includes a generator 232. The turbine 221 is coupled to the generator 232 to drive the generator 232 to generate power. In turn, the generator 232 produces a load on the turbine 221. In some examples, the power provided by the generator 232 is stored in the battery 216 of the aircraft 100. Additionally or alternatively, the power may be supplied directly to one or more electrical device(s) of the aircraft (100), such as the electric motor 215 for the fan 214.

Therefore, in this example, the electric motor 215 (which drives the fan 214) is powered via power from the generator 232. In this example the fan 214 is not directly mechanically coupled to and/or driven by the turbine 221 as in known systems. As mentioned above, this enables improved control of the speed and other parameters of turbine 221 and the fan 214. Further, compared to known systems where the turbine is coupled to the fan, the turbine 221 does not need to be sized for the fan 214, because the speed of the fan 214 can be independently controlled via the electric motor 215.

As disclosed above, in the example of FIG. 2, the high pressure air is provided by the shaft-driven compressor 203, which is driven by the first engine 110. In the illustrated example of FIG. 2, the first engine 110 is implemented as turbofan engine having a gas turbine engine 236 (sometimes referred to as an engine core) and a fan 237. The gas turbine engine 236 drives the fan 237 to produce thrust. The fan 237 rotates within a nacelle 238 of the first engine 110. A fan duct 239 (e.g., a bypass, a passageway, a channel, a nozzle duct, etc.) is defined between an outer wall 240 (sometimes referred to as a core cowl) of the gas turbine engine 236 and the nacelle 238. As the fan 237 rotates, the fan 237 produces airflow. A portion of the airflow flows through the fan duct 239 and bypasses the gas turbine engine 236 to produce forward thrust and another portion of the airflow is also provided to the gas turbine engine 236 for combustion.

The gas turbine engine 236 operates by drawing air through a core air intake 241 (at a fore end of the gas turbine engine 236) and into a compressor 242. The compressor 242 can include multiple compressor sections. For example, the compressor 242 of FIG. 2 is a dual-axial compressor that includes a first compressor 243 and a second compressor 244. Each of the first and second compressors 243, 244 includes various compressor stages that progressively increase the pressure of the air as the air flows from the core air intake 241 to a combustion chamber 245. The first compressor 243 is a low-pressure compressor (LPC) that provides relatively low pressure air and the second compressor 244 is a high-pressure compressor (HPC) that provides relatively high pressure air. The first compressor 243 is coupled to a first drive shaft 246 (sometimes referred to as a low speed spool or N1), and the second compressor 244 is coupled to a second drive shaft 247 (sometimes referred to as a high speed spool or N2). The first drive shaft 246 is coupled to and driven by a first turbine 248 (e.g., a low-pressure turbine (LPT)) and the second drive shaft 247 is coupled to and driven a second turbine 249 (e.g., a high-pressure turbine (HPT)). In this example, the compressor 242 is a dual-axial compressor that includes the two compressors 243, 244. However, in other examples, the compressor 242 can include more or fewer compressor sections, each coupled to a turbine via a respective shaft.

After exiting the second compressor 244 (the HPC), the highly pressurized air is provided to the combustion chamber 245 where fuel is injected and mixed with the highly pressurized air and ignited. The high energy airflow exiting the combustion chamber 245 turns the blades of the first and second turbines 248, 249, which are coupled to respective ones of the first and second drive shafts 246, 247. The first drive shaft 246 extends through and rotates independently of the second drive shaft 247. As such, rotation of the first and second drive shafts 246, 247 turns the blades of the first and second compressors 243, 244, respectively. The heated air is exhausted via a nozzle 250, in the aft direction, where it mixes with the accelerated airflow provided by the fan 237 in the fan duct 239 to produce forward thrust that propels the aircraft 100 (FIG. 1) in a forward direction. While in this example the first engine 110 is implemented as a turbofan engine, the example system 200 can similarly be implemented in connection with other types of engines.

As illustrated in FIG. 2, the compressor 203 is not driven by the turbine 221 (as seen in known systems). Instead, the compressor 203 is driven by the first engine 110. The compressor 203 is operatively coupled to a gearbox 254 (e.g., coupled to an output shaft or off-take of the gearbox 254), which is operatively coupled to a first end 255 of a drive shaft 256 (e.g., a radial drive shaft). The drive shaft 256 rotates to provide power to the gearbox 254 and, thus, to the compressor 203. In the illustrated example, a second end 257 of the drive shaft 256 is operatively coupled to the first engine 110. Specifically, in this example, the second end 257 of the drive shaft 256 is coupled to a first gear 258. The first gear 258 is engaged with a second gear 259 that is operatively coupled to the HPC drive shaft 247. As the HPC drive shaft 247 rotates, the second gear 259, which is engaged with the first gear 258, rotates the first gear 258 and, thus, the drive shaft 256. By extracting fan air having relatively lower pressure (below that demanded the systems of the aircraft) and increasing the pressure of the fan air via the compressor 203 (driven by the drive shaft 256) to meet the demands of the air conditioning pack 201, less energy is wasted as compared to known systems where high pressure bleed air is extracted and regulated down via a valve to the desired pressure. Thus, the example system 200 reduces the specific fuel consumption of the first engine 110. In some examples, one or more other devices used in the aircraft may be operatively coupled to and driven by the gearbox 254, such as an electrical generator and/or a hydraulic pump. Although the second gear 259 is shown as operatively coupled to the HPC drive shaft 247 in the illustrated example, in other examples the second gear 259 may be operatively coupled to and driven by the LPC drive shaft 246 or any other drive shaft of the first engine 110. In some examples, the compressor 203 and/or the gearbox 254 are disposed within the nacelle of the first engine 110.

In the illustrated example, the compressor 203 includes a compressor inlet 262 and a compressor outlet 263. The compressor inlet 262 receives inlet air and, when the compressor 203 is driven, the compressor 203 increases a pressure of the inlet air from the compressor inlet 262 to the compressor outlet 263. The compressor outlet 263 is fluidly coupled to the first inlet 206 of the heat exchanger 205 via the passageway 204. Thus, the compressor 203 increases a pressure of the inlet air and provides high pressure air to the first inlet 206 of the heat exchanger 205 as cabin supply air. In this example, the inlet air is fan air extracted from the fan duct 239 of the first engine 110. As illustrated in FIG. 2, a passageway 264 fluidly couples a port 265 in the nacelle 238 and the compressor inlet 262 to provide fan air from the fan duct 239 to the compressor 203. Thus, in this example, the high pressure air source 202 is boosted fan air from the fan duct 239.

By using the shaft-driven compressor 203, more variability can be achieved to provide cabin supply air at optimal temperature and pressure to the air conditioning pack 201. For example, the gearing in the gearbox 254 can be changed to control the speed of the compressor 203. In particular, the gear ratio between the drive shaft 256 and the off-take or output shaft that drives the compressor 203 can be changed. Additionally or alternatively, in some examples, the compressor 203 includes variable inlet guide vanes 266. The variable inlet guide vanes 266 are moveable between open and closed positions to change the flow rate through the compressor 203. Further, in some examples, the compressor 203 includes variable outlet guide vanes 267. The variable outlet guide vanes 267 can be similarly moved been open and closed positions to change the flow rate through the compressor 203.

The example system 200 includes a control system 270 to operate the various devices and control the operation of the system 200. The control system 270 can be implemented by a controller or processor, such as the processor 612 of the processor platform 600 disclosed in connection with FIG. 6. The control system 270 is communicatively coupled to one or more sensors (disclosed in further detail below), the valves 218, 220, 228, the electric motor 215, the variable area nozzle 217 of the fan 214, the variable area nozzle 231 of the turbine 221, the generator 232, the gearbox 254, the variable inlet guide vanes 266 of the compressor 203, the variable outlet guide vanes 267 of the compressor 203, and/or any other device that controls and/or monitors various parameters of the system 200.

In the illustrated example, the control system 270 includes an input/output module 271, a comparator 272, a valve controller 273, a fan instrument controller 274, a turbine instrument controller 275, and a compressor instrument controller 276. The input/output module 271 receives signals from one or more sensors measuring one or more parameters of the system 200. The comparator 272 compares the measured values of the parameter(s) to one or more thresholds or threshold ranges. Based on whether the parameter(s) satisfy the thresholds or threshold ranges, the controllers 273, 274, 275, 276 can operate one or more of the devices to result in optimal cabin supply air pressure and temperature. For example, the valve controller 273 controls the states of the valves 218, 220, 228. For instance, any of the valves 218, 220, 228 can be operated between an open state and a closed state and any state therebetween (e.g., half open) to control the flow of fluid through the respective passageways. Further, while only three valves are illustrated in FIG. 2, one or more additional valves can be incorporated in other ones of the passageways, such as the passageway 225, the passageway 264, etc. The fan instrument controller 274 controls the electric motor 215 (to control the speed of the fan 214) and/or the variable area nozzle 217 of the fan 214, thereby controlling the flow rate of the cabin exhaust air through the heat exchanger 205. The turbine instrument controller 275 controls a load on the turbine 221, by controlling the load provided by the generator 232, and/or the variable area nozzle 231 of the turbine 221, thereby affecting the pressure and temperature drop across the turbine 221. The compressor instrument controller 276 controls the gearbox 254 (to control the speed of the compressor 203), the variable inlet guide vanes 266, and/or the variable outlet guide vanes 267, thereby controlling at least one of the temperature, pressure, or flow rate of the air at the compressor outlet 263.

As disclosed above, one or more sensors (e.g., temperature sensors, pressure sensors, flow sensors, humidity sensors, etc.) can be used to measure the temperature, pressure, flow rate, water content, and/or any other parameters of the cabin supply air and cabin exhaust air at various points in the system 200. For example, one or more sensor(s) 280 is/are coupled to the passageway 264 to measure one or more parameters (e.g., temperature, pressure, etc.) of the fan air flowing to the compressor 203. One or more sensor(s) 281 is/are coupled to the passageway 204 to measure one or more parameters (e.g., temperature, pressure, etc.) of the air exiting the compressor 203 and flowing to the heat exchanger 205. One or more sensor(s) 282 is/are coupled to the passageway 224 to measure one or more parameter(s) (e.g., temperature, pressure, etc.) of the cabin supply air exiting the heat exchanger 205 and flowing to the turbine 221. One or more sensor(s) 283 is/are coupled to the passageway 225 to measure one or more parameter(s) (e.g., temperature, pressure, etc.) of the cabin supply air being supplied to the cabin 108 after the turbine 221. One or more sensor(s) 284 is/are coupled to the passageway 212 to measure one or more parameter(s) (e.g., temperature, pressure, etc.) of the cabin exhaust air flowing to the heat exchanger 205. Additional sensors may be provided in various other locations to similarly measure one or more parameters of the air at various points in the system 200.

An example operation of the system 200 is described below using example temperature and pressure values for the air at various points in the system. Assume the aircraft is flying at 40,000 ft. The atmospheric air is about −70° F. with a pressure of 2.73 PSI. During cruise at this altitude, the fan air in the fan duct 239 has a temperature of about −20° F. and a pressure of about 4.16 PSI. The compressor 203 increases the temperature and pressure of the fan air to about 350-400° F. and 40-50 PSI. The air exiting the compressor outlet 263 is then provided to the air conditioning pack 201 as cabin supply air. The heat exchanger 205 reduces the temperature and pressure of the cabin supply air flowing through the first flow path 208. The cabin exhaust air flowing through the heat exchanger 205 starts at about 80° F. and 3.7 PSI and exits the heat exchanger 205 at about 280-300° F. and 2.5 PSI. The cabin supply air exits the first outlet 207 of the heat exchanger 205 at about 160° F. and 40 PSI. The cabin supply air then flows through the turbine 221, which results in further reduction of the temperature and pressure. The cabin supply air exiting the turbine outlet 223 is at about 27° F. and 11 PSI, which is then supplied to the cabin 108. In some examples, the cabin supply air flows through the water removal unit 226 to remove excess water from the cabin supply air.

In another example, assume the aircraft 100 is idling on the ground (e.g., at an airport gate). On a relatively warm day, the atmospheric air may be at a temperature of about 85° F. with a pressure of 14 PSI. While the first engine 110 is idling, the fan air in the fan duct 239 has a temperature of about 105° F. and a pressure of about 15.7 PSI. The compressor 203 increases the temperature and pressure of the fan air to about 380° F. and 52 PSI. The air exiting the compressor outlet 263 is then provided to the air conditioning pack 201 as cabin supply air. The heat exchanger 205 reduces the temperature and pressure of the cabin supply air flowing through the first flow path 208. The cabin exhaust air flowing through the heat exchanger 205 starts at about 80° F. and 14.05 PSI (e.g., after being mixed with atmospheric air from the passageway 219) and exits the heat exchanger 205 at about 250° F. and 14 PSI. The cabin supply air exits the first outlet 207 of the heat exchanger 205 at about 110° F. and 51 PSI. The cabin supply air then flows through the turbine 221, which results in further reduction of the temperature and pressure. The cabin supply air exiting the turbine outlet 223 is at about 32° F. and 14.2 PSI, which is then supplied to the cabin 108. In some examples, the cabin supply air flows through the water removal unit 226 to remove excess water from the cabin supply air.

During the cycles disclosed above, the sensor(s) 280, 281, 282, 283, 284 output signals (e.g., corresponding to the measured temperature, pressure, flow, etc. of the air) to the control system 270 via the input/output module 271. The comparator 272 compares the parameter values to various thresholds. If a parameter falls outside of a threshold, one or more of the devices of the system 200 can be controlled to affect the cabin supply air. Variables that affect the cabin air supply temperature and pressure include the pressure and/or temperature of the atmospheric air, the speed of the first engine 110, the temperature and/or pressure of the fan air, the speed of the drive shaft 256, the temperature and/or pressure of the cabin exhaust air, etc.

In some examples, the fan 214 is operable in two modes: a first mode of operation in which the fan 214 is driven by the electric motor 215 to direct the cabin exhaust air to the atmosphere, and a second mode of operation in which the fan 214 is driven by the cabin exhaust air and the fan 214 drives the electric motor 215 to generate power. For example, in some instances, the pressure drop between the cabin 108 and the atmosphere is large enough such that when the valve 218 is opened, the cabin exhaust air flows from the cabin 108 and through the heat exchanger 205 to the atmosphere. In such an example, the fan 214 is not needed to move the cabin exhaust air through the passageways 212, 213. Instead, the fan 214 can be used as a generator to generate additional electrical power. For example, the fan instrument controller 274 may switch the electric motor 215 into a generator mode. The cabin exhaust air flowing through the passageway 213 drives the fan 214, which drives the electric motor 215 to produce power. The power produced by the electric motor 215 can be stored in the battery 216 and/or used directly by one or more electric devices of the aircraft 100. In this second mode of operation, the fan 214 also provides a back-pressure for controlling the pressure of the air in the cabin 108.

Figure 3:
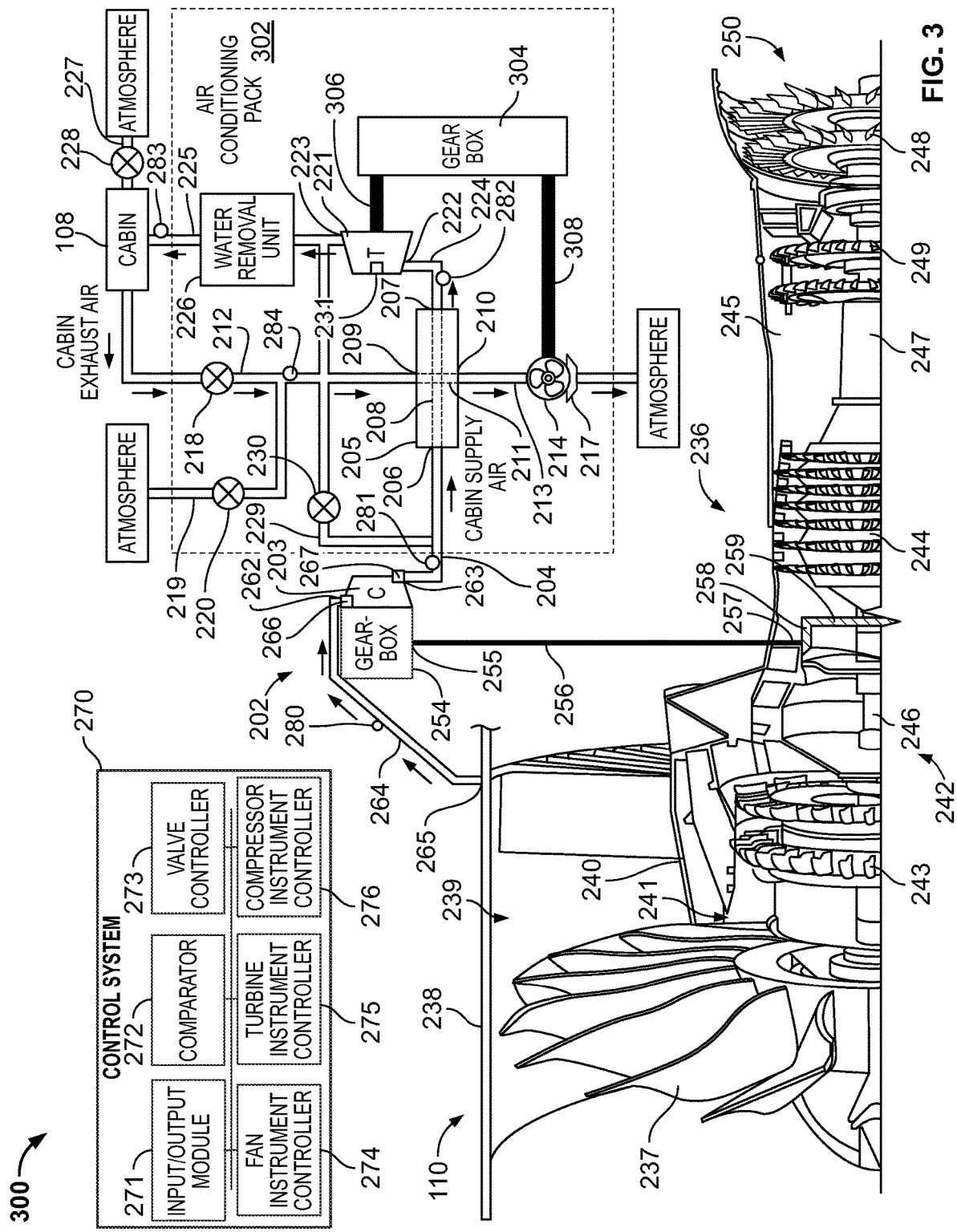
FIG. 3 is a schematic illustration of another example system to produce cabin air implemented in connection with an engine of the example aircraft of FIG. 1.

FIG. 3 illustrates another example system 300 including an example air conditioning pack 302 constructed in accordance with the teachings of this disclosure. The example system 300 is also illustrated in connection with the first engine 110. Those components of the example system 300 and/or the air conditioning pack 302 that are substantially similar or identical to the components of the example system 200 and/or the air conditioning pack 201 disclosed above in connection with FIG. 2 have been numbered in FIG. 3. However, those components will not be described in detail again below. Instead, the interested reader is referred to the above corresponding descriptions.

The system 300 and the air conditioning pack 302 of FIG. 3 are substantially similar the system 200 and the air conditioning pack 201 of FIG. 1. However, in FIG. 3, the turbine 221 of the air conditioning pack 302 is mechanically coupled to and drives the fan 214. As such, in this example, the fan 214 provides a direct load on the turbine 221. In the illustrated example, the turbine is mechanically coupled to the fan 214 via a gearbox 304. The turbine 221 is coupled to and drives an input shaft 306 of the gearbox 304. An output shaft 308 of the gearbox 304 is coupled to and drives the fan 214. The gearing in the gearbox 304 is operated by the fan instrument controller 274 and/or the turbine instrument controller 275 of the control system 270 to change the shaft speeds between the turbine 221 and the fan 214, thereby changing the load on the turbine 221 and/or the speed of the fan 214. In other examples, a gearbox may not be provided. Instead a fixed gear system may be disposed between the turbine 221 and the fan 214.

FIG. 4 illustrates another example system 400 constructed in accordance with the teachings of this disclosure. The example system 400 is also illustrated in connection with the first engine 110. Those components of the example system 400 that are substantially similar or identical to the components of the example system 200 disclosed above in connection with FIG. 2 and that have functions substantially similar or identical to the functions of those components have been numbered in FIG. 4. However, those components will not be described in detail again below. Instead, the interested reader is referred to the above corresponding descriptions.

In the example of FIG. 4, the high pressure air source 202 is implemented by an engine bleed air system 402. The engine bleed air system 402 extracts bleed air from the gas turbine engine 236 and provides the high pressure, high temperature air to the passageway 204 as cabin supply air. In some examples, the engine bleed air system 402 is capable of providing enough variability in the temperature and pressure of the air provided to the air conditioning pack 201. In this example, the engine bleed air system 402 is a two-port bleed air system. In particular, the engine bleed air system 402 includes a first passageway 404 coupled to a first bleed port 406 (e.g., at an intermediate stage) of the second compressor 244 (the HPC) and a second passageway 408 coupled to a second bleed port 410 (e.g., at a discharge station) of the second compressor 244 (the HPC). The second bleed port 410 is disposed downstream of the first bleed port 406. As a result, the pressure of the bleed air supplied by the second bleed port 410 is higher than the pressure of the bleed air supplied by the first bleed port 406. The first and second passageways 404, 408 join together at the passageway 204, which directs the air to the first inlet 206 of the heat exchanger 205. Thus, the engine bleed air system 402 may supply bleed air from either the first bleed port 406 and/or the second bleed port 410 to the air conditioning pack 201.

If the bleed air provided by the first bleed port 406 is insufficient to meet the pressure and/or temperature demands, bleed air from the second bleed port 410 can be added. As shown in the illustrated example of FIG. 4, a valve 412 is coupled to the second passageway 408 between the second bleed port 410 and the junction of the first and second passageways 404, 408. The valve 412 may be configured, for example, to regulate the pressure of the bleed air supplied by the second bleed port 442 to a pre-set or predetermined pressure value prior to supplying the bleed air to the air conditioning pack 201 and/or the valve 412 may provide fluid flow shut-off (e.g., a PRV, a PRSOV, an SOV, an HPSOV). To prevent back flow pressure from entering the first bleed port 406, a check valve 414 (e.g., a back-flow preventer, an intermediate port check valve (IPCV)) is coupled to the first passageway 404. The check valve 414 prevents pressurized bleed air from flowing toward the first bleed port 406 when higher pressure bleed air is present in the passageway 204.

The valve 412 is controlled by the valve controller 273 of the control system 270. Depending on the desired air pressure and temperature to be delivered to the first inlet 206 of the heat exchanger 205, the valve controller 273 can operate the valve 412 to provide more or less bleed air from the second bleed port 410. While the example engine bleed air system 402 is shown as being implemented in connection with the air conditioning pack 201 (having the generator 232), the example engine bleed air system 402 can be similarly implemented with the air conditioning pack 302 of FIG. 3 (having the direct mechanical connection between the turbine 221 and the fan 214).

While an example manner of implementing the control system 270 is illustrated in FIGS. 2-4, one or more of the elements, processes and/or devices illustrated in FIG. 2 may be combined, divided, re-arranged, omitted, eliminated and/or implemented in any other way. Further, the example input/output module 271, the example comparator 272, the example valve controller 273, the example fan instrument controller 274, the example turbine instrument controller 275, the example compressor instrument controller 276, and/or, more generally, the example control system 270 of FIGS. 2-4 may be implemented by hardware, software, firmware and/or any combination of hardware, software and/or firmware. Thus, for example, any of the example input/output module 271, the example comparator 272, the example valve controller 273, the example fan instrument controller 274, the example turbine instrument controller 275, the example compressor instrument controller 276 and/or, more generally, the example control system 270 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input/output module 271, the example comparator 272, the example valve controller 273, the example fan instrument controller 274, the example turbine instrument controller 275, and/or the example compressor instrument controller 276 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control system of FIGS. 2-4 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
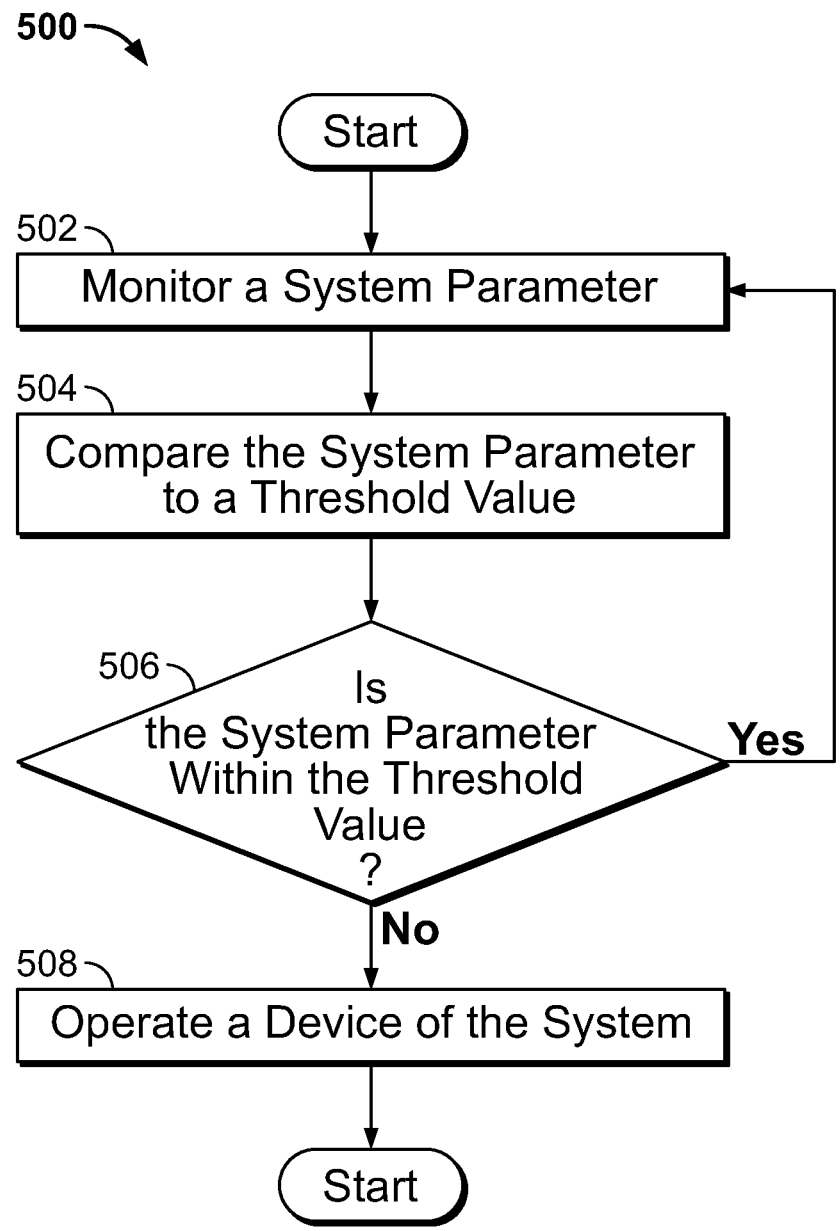
FIG. 5 is a flowchart representative of example machine readable instructions that may be implemented by an example control system of any of the example systems of FIGS. 2, 3, and 4.

A flowchart representative of example hardware logic, machine readable instructions, hardware implemented state machines, and/or any combination thereof for implementing the control system 270 of FIGS. 2-4 is shown in FIG. 5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example control system 270 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B. Further, the use of the terms "first," "second," "third," etc. in connection with any parts (e.g., valves, passageways, etc.) or modes is merely used to distinguish one part or mode from another part or mode. These terms are non-limiting and are not intended to indicate a specific sequence or specific number of parts or modes.

FIG. 5 is a flowchart representing an example process 500 that may be implemented by the control system 270 of FIGS. 2, 3, and/or 4 to control the operation of the respective systems 200, 300, 400. At block 502, the control system 270 monitors a system parameter of the system 200, 300, 400. The control system 270 receives one or more signals from sensors (e.g., sensors 280, 281, 282, 283, 284) throughout the system 200, 300, 400. For example, a system parameter may include an air temperature value, an air pressure value, a water content value, a flow rate, and/or any other measurable parameter. The control system 270 receives the signals via the input/output module 271.

At block 504, the control system 270 compares the system parameter to a threshold value. For example, the control system 270 can compare, via the comparator 296, the pressure, temperature, and/or any other parameter of the air detected by the sensor(s) to respective threshold values retrieved from a look-up table or storage or with the other values received by the sensors. In some examples, the system parameter and/or the threshold value may be based on other operating conditions of the aircraft.

At block 506, the comparator 272 determines whether the system parameter measured by, for example, the sensor(s) is within the threshold value. If the system parameter is within the threshold value, then the control system 270 returns to block 502 to continue monitoring the system parameter. For example, in the system 200 of FIG. 2, the fan instrument controller 274 may be operating the fan 214 at a particular speed to move the cabin exhaust air through the heat exchanger 205. If the flow rate of the cabin exhaust air through the heat exchanger 205 is providing sufficient cooling capacity for the incoming cabin supply air, the fan instrument controller 274 may continue to operate the fan 214 at the same speed.

If the comparator 272 determines that the system parameter is not within the threshold value, then, at block 508, one or more of the controllers 273, 274, 275, 276 may operate the respective device(s). For example, the valve controller 273 controls the valves 218, 220, 228, 412. The fan instrument controller 274 controls at least one of the speed of the fan 214, the variable area nozzle 217 of the fan 214, and/or the gearbox 304 (FIG. 3). The turbine instrument controller 275 controls at least one of the variable area nozzle 231 of the turbine 221, the generator 232 (FIG. 2), and/or the gearbox 304 (FIG. 3). The compressor instrument controller 276 controls at least one of the gearbox 254, the variable inlet guide vanes 266, and/or the variable outlet guide vanes 267. For example, if the temperature and/or pressure of the cabin supply air exiting the compressor 203 is too low, the compressor instrument controller 276 can increase the flow rate of the air through the compressor 203 by changing the gearing in the gearbox 254, changing the variable inlet guide vanes 266, and/or changing the variable outlet guide vanes 267. The control system 293 may also be employed to similarly control the other devices. The example process of FIG. 5 may be repeated again. Otherwise, if the aircraft 100 is not in flight, the process 500 of FIG. 5 may end.

Figure 6:
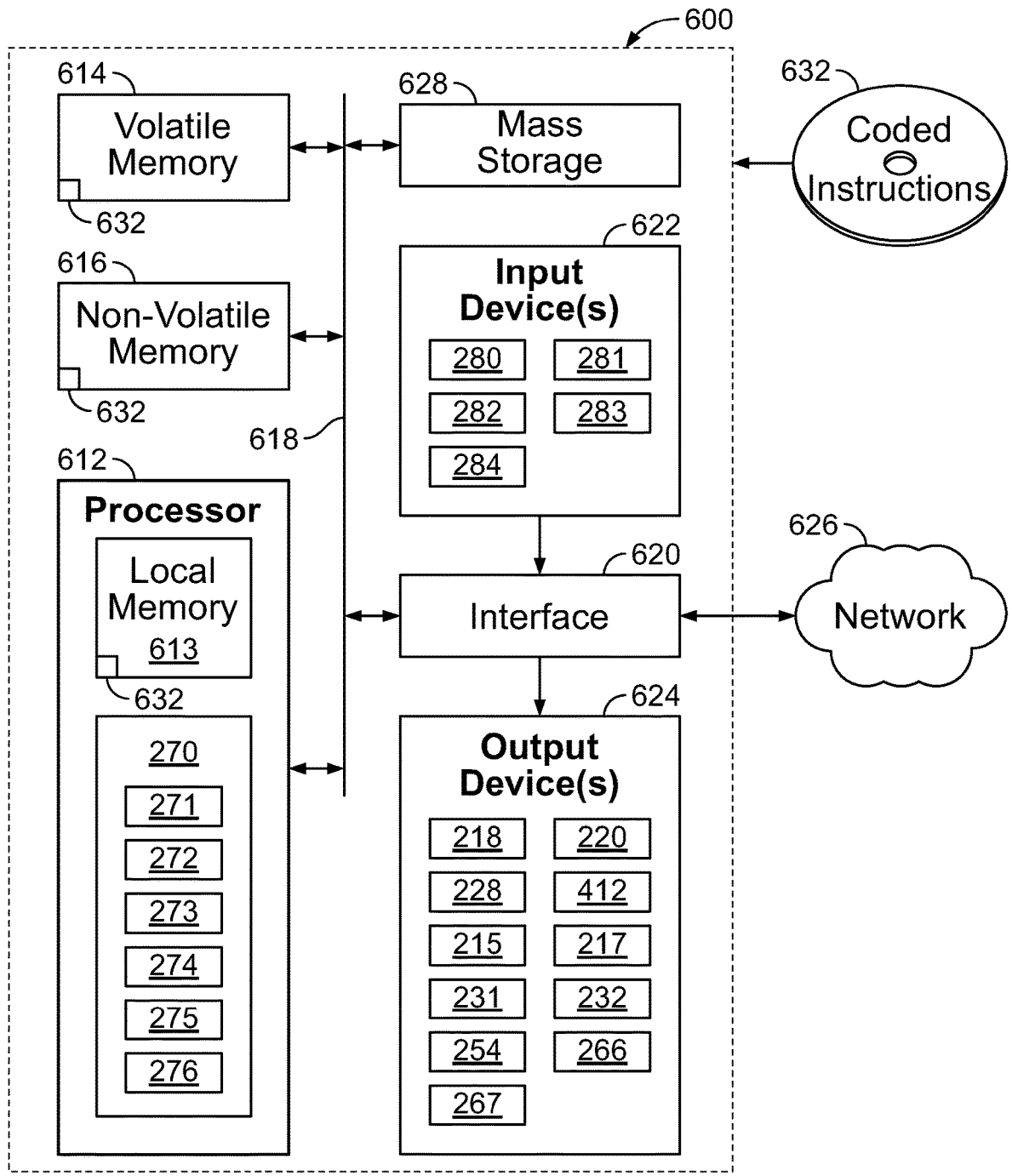
FIG. 6 is a block diagram of an example processing platform structured to execute the instructions of FIG. 5 to implement the example control system of any of the example systems of FIGS. 2, 3, and/or 4.

FIG. 6 is a block diagram of an example processor platform 600 structured to execute the instructions of FIG. 5 to implement the control system 270 of FIGS. 2, 3 and/or 4. The processor platform 600 can be, for example, a server, a personal computer, a workstation, a self-learning machine (e.g., a neural network), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example input/output module 271, the example comparator 272, the example valve controller 273, the example fan instrument controller 274, the example turbine instrument controller 275, the example compressor instrument controller 276 and/or, more generally, the example control system 270.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a device and/or user to enter data and/or commands into the processor 612. In this example, the input device(s) 622 can include the sensors 280-284. Additionally or alternatively, the input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output device(s) 624 can include, for example, the valves 218, 220, 228, 412, the electric motor 215, the variable area nozzle 217 of the fan 214, the variable area nozzle 231 of the turbine 221, the generator 232, the gearbox 254, the variable inlet guide vanes 266 of the compressor 203, the variable outlet guide vanes 267 of the compressor 203. Additionally or alternatively, the output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. Therefore, in some examples, the interface circuit 620 of the illustrated example can include a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIG. 5 may be stored in the mass storage device 628, in the volatile memory 614, in the non-volatile memory 616, and/or on a removable non-transitory computer readable storage medium such as a CD or DVD.

From the foregoing, it will be appreciated that example systems and methods have been disclosed that utilize cabin exhaust air to cool incoming cabin supply air, which results in a more efficient use and cycle of the cabin air. Further, by using cabin exhaust air instead of atmospheric air from a ram air inlet as in known systems, the ram air inlet and ram air circuitry can be removed, which reduces weight and drag on the aircraft. Some example systems and methods disclosed herein utilize a generator that is coupled to the turbine, which not only produces a load on the turbine, but also produces power that can be stored and/or used for various electrical devices on the aircraft. Example systems and methods disclosed herein also utilize a de-coupled turbine and compressor, which enables more varied control of the compressor and turbine to produce optimal cabin supply air. Further, examples disclosed herein reduce the volume and weight of the circuitry used to produce cabin supply air. Thus, the example systems and methods increase fuel efficiency of the aircraft.

The following paragraphs provide various examples of the examples disclosed herein.

Example 1 is a system to produce air for a cabin of an aircraft. The system includes an air conditioning pack including a heat exchanger including a first inlet fluidly coupled to a first outlet via a first flow path, the first inlet to receive cabin supply air from a high pressure air source, and a second inlet fluidly coupled to a second outlet via a second flow path. The second flow path is isolated from the first flow path. The second inlet is to receive cabin exhaust air from the cabin of the aircraft. The cabin exhaust air is to reduce a temperature of the cabin supply air via the heat exchanger. The air conditioning pack also includes a turbine having a turbine inlet and a turbine outlet. The turbine inlet fluidly is coupled to the first outlet of the heat exchanger. The turbine is to reduce a temperature and pressure of the cabin supply air between the turbine inlet and the turbine outlet. The turbine outlet is fluidly coupled to the cabin to provide the cabin supply air to the cabin. The air conditioning pack further includes a fan to direct the cabin exhaust air from the heat exchanger to atmosphere.

Example 2 includes the system of Example 1, wherein the air conditioning pack includes a generator, and wherein the turbine is coupled to the generator to drive the generator to generate power.

Example 3 includes the system of Example 2, wherein the air conditioning pack includes an electric motor to drive the fan, and wherein the electric motor is powered via the power from the generator.

Example 4 includes the system of Example 3, wherein, in a first mode of operation, the fan is driven by the electric motor to direct the cabin exhaust air to the atmosphere, and in a second mode of operation, the fan is driven by the cabin exhaust air and the fan drives the electric motor to generate power.

Example 5 includes the system of any of Examples 1-4, further including a compressor driven by a shaft extending from an engine of the aircraft, wherein the compressor includes a compressor inlet and a compressor outlet. The compressor inlet is to receive inlet air, the compressor outlet is fluidly coupled to the first inlet of the heat exchanger, and the compressor is to increase a pressure of the inlet air and provide high pressure air to the first inlet of the heat exchanger as the cabin supply air.

Example 6 includes the system of Example 5, wherein the inlet air is fan air extracted from a fan duct of the engine of the aircraft.

Example 7 includes the system of Example 5 or 6, further including a control system. The control system is to control at least one of a pressure or temperature of the high pressure air at the compressor outlet by controlling at least one of a speed of the compressor, variable inlet guide vanes of the compressor, or variable outlet guide vanes of the compressor.

Example 8 includes the system of Example 7, wherein the control system is to control at least one of a load on the turbine or a variable area nozzle of the turbine.

Example 9 includes the system of Example 8, wherein the control system is to control at least one of a speed of the fan or a variable area nozzle of the fan.

Example 10 includes the system of Example 1, wherein the turbine is mechanically coupled to the fan via a gearbox.

Example 11 includes the system of any of Examples 1-10, further including a valve to direct atmospheric air into the second inlet with the cabin exhaust air.

Example 12 is a system to produce air for a cabin of an aircraft. The system includes an air conditioning pack including a heat exchanger including a first flow path to receive cabin supply air and a second flow path, isolated from the first flow path, to receive cooling air. The cooling air is to reduce a temperature of the cabin supply air flowing through the first flow path. The air conditioning pack also includes a turbine having a turbine inlet and a turbine outlet. The turbine inlet is to receive the cabin supply air from the heat exchanger. The turbine outlet is fluidly coupled to the cabin to supply the cabin supply air to the cabin. The air conditioning pack further includes a generator. The turbine is coupled to the generator. The turbine is to drive the generator to generate power. The air conditioning pack also includes a fan to control a flow rate of the cooling air through the second flow path of the heat exchanger. The fan is driven by an electric motor that is powered via the power generated by the generator.

Example 13 includes the system of Example 12, wherein the cooling air is cabin exhaust air vented from the cabin of the aircraft.

Example 14 includes the system of Examples 12 or 13, further including a control system to control at least one of a load on the turbine or a variable area nozzle of the turbine.

Example 15 includes the system of any of Examples 12-14, further including a compressor driven by a shaft extending from an engine of the aircraft. The compressor is to provide high pressure air as the cabin supply air to the heat exchanger.

Example 16 is an aircraft including a fuselage having a cabin and a system to produce air for the cabin. The system includes a compressor to produce pressurized air to be used as cabin supply air and an air conditioning pack. The air conditioning pack includes a heat exchanger to receive the cabin supply air from the compressor, the heat exchanger to reduce a temperature of the cabin supply air, and a turbine having a turbine inlet and a turbine outlet. The turbine inlet is to receive the cabin supply air from the heat exchanger. The turbine outlet is fluidly coupled to the cabin to supply the cabin supply air to the cabin. The compressor is not driven by the turbine.

Example 17 includes the aircraft of Example 16, wherein the compressor is driven by a shaft extending from an engine of the aircraft.

Example 18 includes the aircraft of Examples 16 or 17, wherein the heat exchanger reduces a temperature of the cabin supply air using cabin exhaust air vented from the cabin.

Example 19 includes the aircraft of Example 18, wherein the air conditioning pack includes a fan to control a flow rate of the cabin exhaust air flowing through the heat exchanger, the fan driven by an electric motor.

Example 20 includes the aircraft of any of Examples 16-19, wherein the air conditioning pack further includes a generator driven by the turbine, the turbine to drive the generator to generate power.

Although certain example methods, apparatus, systems, and articles of manufacture have been disclosed herein, the scope of coverage of this patent is not limited thereto. On the contrary, this patent covers all methods, apparatus, systems, and articles of manufacture fairly falling within the scope of the claims of this patent.

What is claimed is:

1. A system to produce air for a cabin of an aircraft, the system comprising:
an air conditioning pack including:
a heat exchanger including:
a first inlet fluidly coupled to a first outlet via a first flow path, the first inlet to receive cabin supply air from a high pressure air source; and
a second inlet fluidly coupled to a second outlet via a second flow path, the second flow path isolated from the first flow path, the second inlet to receive cabin exhaust air from the cabin of the aircraft, the cabin exhaust air to reduce a temperature of the cabin supply air via the heat exchanger;
a turbine having a turbine inlet and a turbine outlet, the turbine inlet fluidly coupled to the first outlet of the heat exchanger, the turbine to reduce a temperature and pressure of the cabin supply air between the turbine inlet and the turbine outlet, the turbine outlet fluidly coupled to the cabin to provide the cabin supply air to the cabin; and
a fan to direct the cabin exhaust air from the heat exchanger to atmosphere, the fan and the turbine mechanically coupled via a gearbox.

2. The system of claim 1, further including a compressor driven by a shaft extending from an engine of the aircraft, wherein the compressor includes a compressor inlet and a compressor outlet, the compressor inlet to receive inlet air, the compressor outlet fluidly coupled to the first inlet of the heat exchanger, the compressor to increase a pressure of the inlet air and provide high pressure air to the first inlet of the heat exchanger as the cabin supply air.

3. The system of claim 2, wherein the inlet air is fan air extracted from a fan duct of the engine of the aircraft.

4. The system of claim 2, further including a control system, the control system to control at least one of a pressure or temperature of the high pressure air at the compressor outlet by controlling at least one of a speed of the compressor, variable inlet guide vanes of the compressor, or variable outlet guide vanes of the compressor.

5. The system of claim 4, wherein the control system is to control at least one of a load on the turbine or a variable area nozzle of the turbine.

6. The system of claim 5, wherein the control system is to control at least one of a speed of the fan or a variable area nozzle of the fan.

7. The system of claim 1, further including a valve to direct atmospheric air into the second inlet with the cabin exhaust air.

8. A system to produce air for a cabin of an aircraft, the system comprising:
an air conditioning pack including:
a heat exchanger including:
a first flow path to receive cabin supply air; and
a second flow path, isolated from the first flow path, to receive cooling air, the cooling air to reduce a temperature of the cabin supply air flowing through the first flow path;
a compressor, separate from a compressor stage of an engine of the aircraft, to provide high pressure air as the cabin supply air to the heat exchanger, the compressor driven by a shaft extending from the engine of the aircraft;
a turbine having a turbine inlet and a turbine outlet, the turbine inlet to receive the cabin supply air from the heat exchanger, the turbine outlet fluidly coupled to the cabin to supply the cabin supply air to the cabin;
a generator, the turbine coupled to the generator, the turbine to drive the generator to generate power; and
a fan to control a flow rate of the cooling air through the second flow path of the heat exchanger, the fan driven by an electric motor that is powered via the power generated by the generator.

9. The system of claim 8, wherein the cooling air is cabin exhaust air vented from the cabin of the aircraft.

10. The system of claim 8, further including a control system to control at least one of a load on the turbine or a variable area nozzle of the turbine.

11. The system of claim 8, wherein the fan is downstream of the heat exchanger.

12. The system of claim 10, wherein the control system is further to control at least one of a speed of the fan or a variable area nozzle of the fan.

13. An aircraft comprising:
a fuselage having a cabin; and
a system to produce air for the cabin, the system including:
a compressor to produce pressurized air to be used as cabin supply air, the compressor separate from a compressor stage of an engine of the aircraft; and
an air conditioning pack, the air conditioning pack including:
a heat exchanger to receive the cabin supply air from the compressor, the heat exchanger to reduce a temperature of the cabin supply air; and
a turbine having a turbine inlet and a turbine outlet, the turbine inlet to receive the cabin supply air from the heat exchanger, the turbine outlet fluidly coupled to the cabin to supply the cabin supply air to the cabin, wherein the compressor is not driven by the turbine.

14. The aircraft of claim 13, wherein the compressor is driven by a shaft extending from an engine of the aircraft.

15. The aircraft of claim 13, wherein the heat exchanger reduces a temperature of the cabin supply air using cabin exhaust air vented from the cabin.

16. The aircraft of claim 15, wherein the air conditioning pack includes a fan to control a flow rate of the cabin exhaust air flowing through the heat exchanger, the fan driven by an electric motor.

17. The aircraft of claim 13, wherein the air conditioning pack further includes a generator driven by the turbine, the turbine to drive the generator to generate power.

18. The aircraft of claim 13, wherein the air conditioning pack includes a generator, and wherein the turbine is coupled to the generator to drive the generator to generate power.

19. The aircraft of claim 18, wherein the air conditioning pack includes:
  a fan to control a flow rate of cooling air through the heat exchanger; and
  an electric motor to drive the fan, wherein the electric motor is powered via the power from the generator.

20. The aircraft of claim 19, wherein, in a first mode of operation, the fan is driven by the electric motor to direct the cooling air to atmosphere, and in a second mode of operation, the fan is driven by the cooling air and the fan drives the electric motor to generate power.

* * * * *